US008576382B2

(12) United States Patent
LaValley et al.

(10) Patent No.: US 8,576,382 B2
(45) Date of Patent: Nov. 5, 2013

(54) METHOD AND APPARATUS FOR CONTROLLING LASER TRANSMISSIONS FOR ENHANCED SAFETY

(75) Inventors: Howard N. LaValley, Albuquerque, NM (US); Thomas H. Chyba, Tijeras, NM (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 13/053,664

(22) Filed: Mar. 22, 2011

(65) Prior Publication Data
US 2012/0242974 A1   Sep. 27, 2012

(51) Int. Cl.
*G01C 3/08* (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,055,664 | A | * | 10/1991 | Ryczek ...................... 250/201.4 |
| 5,837,996 | A | | 11/1998 | Keydar |
| 7,697,581 | B2 | | 4/2010 | Walsh et al. |
| 2003/0002109 | A1 | | 1/2003 | Hochberg et al. |
| 2008/0247752 | A1 | | 10/2008 | Wang |
| 2009/0190120 | A1 | * | 7/2009 | Wustefeld ...................... 356/27 |
| 2009/0273770 | A1 | | 11/2009 | Bauhahn et al. |
| 2011/0121160 | A1 | | 5/2011 | Gion-Pol et al. |
| 2011/0311224 | A1 | * | 12/2011 | Scherbarth ...................... 398/39 |

FOREIGN PATENT DOCUMENTS

| DE | WO2010/094254 | * | 8/2010 |
| JP | 63198816 | | 8/1988 |
| JP | 05157510 | | 6/1993 |
| WO | 2009115343 A1 | | 9/2009 |
| WO | 2010094254 A1 | | 8/2010 |

OTHER PUBLICATIONS

European Search Report, EP12157610, Jun. 29, 2012, 8 pages.
Cannaliato et al., "Short Range Biological Standoff Detection System (SR-BSDS)", Mar. 2, 2000, SPIE vol. 4046, pp. 219-223.
Thomas R. Wehner, "Quick-Look Eye-Safety Assessment for the Short Range Lidar", Los Alamos National Laboratory, Jul. 2, 1998, 12 pages.
Japanese Office Action with English Translation, Jul. 19, 2013, 7 pages.

* cited by examiner

*Primary Examiner* — Luke Ratcliffe
(74) *Attorney, Agent, or Firm* — Edell, Shapiro & Finnan, LLC

(57) ABSTRACT

According to a present invention embodiment, safety is enhanced for a non-eye-safe limited-range laser sensing system. The laser sensing system typically has an operating range limited to a well-defined spatial interval. A range measurement is utilized to control emissions of the non-eye-safe laser. In particular, when the range to a target is outside the designed spatial interval defining the operating range of the laser sensing system, transmission of the non-eye-safe laser beam is disabled or rendered non-hazardous. In other words, the transmission of the non-eye-safe laser beam is disabled in response to no detection of a hard target within the operating range of the laser sensing system, or when an object is detected between the laser sensing system and the spatial interval that defines the operating range. The target distance may be tracked to change the location (and possibly, width) of the adaptive spatial interval defining the operating range.

30 Claims, 4 Drawing Sheets

METHOD AND APPARATUS FOR CONTROLLING LASER TRANSMISSIONS FOR ENHANCED SAFETY

BACKGROUND

1. Technical Field

Present invention embodiments pertain to laser systems. In particular, present invention embodiments pertain to controlling transmissions of non-eye-safe laser signals from a laser sensing system to provide enhanced safety for nearby objects (e.g., persons, animals, etc.) situated outside the boundaries of the operating range of the laser sensing system.

2. Discussion of Related Art

Active laser sensors transmit a laser pulse to interrogate a substance, and detect a response from the substance to the transmitted laser pulse. For example, Raman sensors detect return or scattered light with constituent colors based on vibrational modes excited in the chemical compound being interrogated. Other sensors may employ other phenomenologies such as Laser Induced Breakdown (LIB) or Photo-thermal Induced physical phenomena. In each of these applications, the surface of the object must be illuminated with sufficient laser energy to stimulate the physical process. Accordingly, the power of the transmitting laser is increased in order to obtain a sufficient return signal from the substance. The laser power, temporal wave shape, and frequency of the laser determine the class of the laser, and the maximum permissible exposure for the laser source is determined by ANSI Z136.1-2000—American National Standard for Safe Use of Lasers. Typically, a safety exclusion zone (defined by the distance beyond which eye or skin damage is not possible) is many times greater than the operating range relevant to the laser sensor.

In certain applications, the laser characteristics can be controlled to enable the emitted light to always be eye-safe. These sensors typically have a very short effective range. Further, sensor operation may be performed in a region of the optical spectrum which is intrinsically safer. However, this is not always possible due to limitations of technology, or the attributes of the underlying phenomenology that the sensor employs (e.g., Raman scattering is most efficient in the ultraviolet region). An alternative technique to ensure safety is to require all personnel within the safety exclusion zone to wear appropriate personal protective equipment (PPE) (i.e., skin covering and eye safety glasses).

In many applications, especially those requiring detection at long ranges, the wavelength, pulse energy, or pulse shape of the illuminating laser may not be changed. Moreover, limiting personnel exposure, either by excluding all personnel or by requiring personnel to wear personal protective equipment (PPE), may not be possible. In some cases, the exclusion zone may be too large to even render this approach feasible.

SUMMARY

According to an embodiment of the present invention, the level of safety of an intrinsically non-eye-safe limited-range laser sensing system is enhanced for persons or other objects (e.g., animals, etc.) situated outside a spatial interval defining the limited operating range of the laser sensing system. The laser sensing system typically has an operating range limited to a well-defined spatial interval (e.g., an interval within 20 cm of a solid target under interrogation by the laser sensing system, the entire distance between the laser sensing system and a hard target that stops the interrogating laser beam, etc.). The laser sensing system interrogates a hard target (e.g., including solid substances and non-solid but optically opaque substances (e.g., a liquid, a gas, a cloud, etc.) that stops the non-eye-safe laser beam (e.g., or attenuates it sufficiently to render it eye-safe)). For example, the laser sensing system may interrogate a chemical droplet, biological material, or an explosive residue on a wall, table, vehicle exterior, or the ground. The laser sensing system may also sample an intervening region of air (e.g., interrogating gases emanating from a vehicle or a smokestack with a hard backstop to the laser beam, etc.).

Present invention embodiments use a measurement of the range to the target to control emissions of the non-eye-safe laser. In particular, when the range to a target is outside the designed spatial interval defining the operating range of the laser sensing system, transmission of the non-eye-safe laser beam is disabled (e.g., including interruption or termination of the non-eye-safe laser beam, or modifying the non-eye-safe laser beam to be eye-safe). In other words, transmission of the non-eye-safe laser beam is disabled in response to no detection of a hard target within the operating range of the laser sensing system, or when an object is detected between the laser sensing system and the spatial interval that defines the operating range.

The operating range may be determined from intrinsic hardware limitations (e.g. the laser sensing system is unable to efficiently detect outside a given spatial interval based upon its optical design) and/or an adaptive controller (e.g. when a target surface is detected within the operating range, the laser sensing system may automatically limit the operating range to a smaller spatial interval enclosing the target in order to enhance eye-safety by disabling transmission of the non-eye-safe laser when an object is detected outside that adaptive operating range). The controller may adaptively track the target distance to change the location (and possibly, width) of the adaptive spatial interval defining the operating range as the distance from the laser sensing system to the target surface under investigation varies. The controller may autonomously control the extent of the operating range (e.g., based upon three dimensional (3-D) mapping of the entire target, or the user may be allowed to enter information to better define the operating range for a given interrogation scenario).

Present invention embodiments do not provide protection for persons within the operating range of the laser sensing system (since other devices such as passive infrared detectors may be used for that purpose), and do not protect against specular reflections or scattering of the non-eye-safe laser beam from a target within the operating range. Such light may propagate outside the operating range and be hazardous. However, present invention embodiments protect nearby persons or other objects (e.g., animals, etc.) that are outside the boundaries of the laser sensing system operating range provided the rangefinder detects them or determines no hard target is present within the sensor's operating range.

The above and still further features and advantages of present invention embodiments will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

Figure 1:
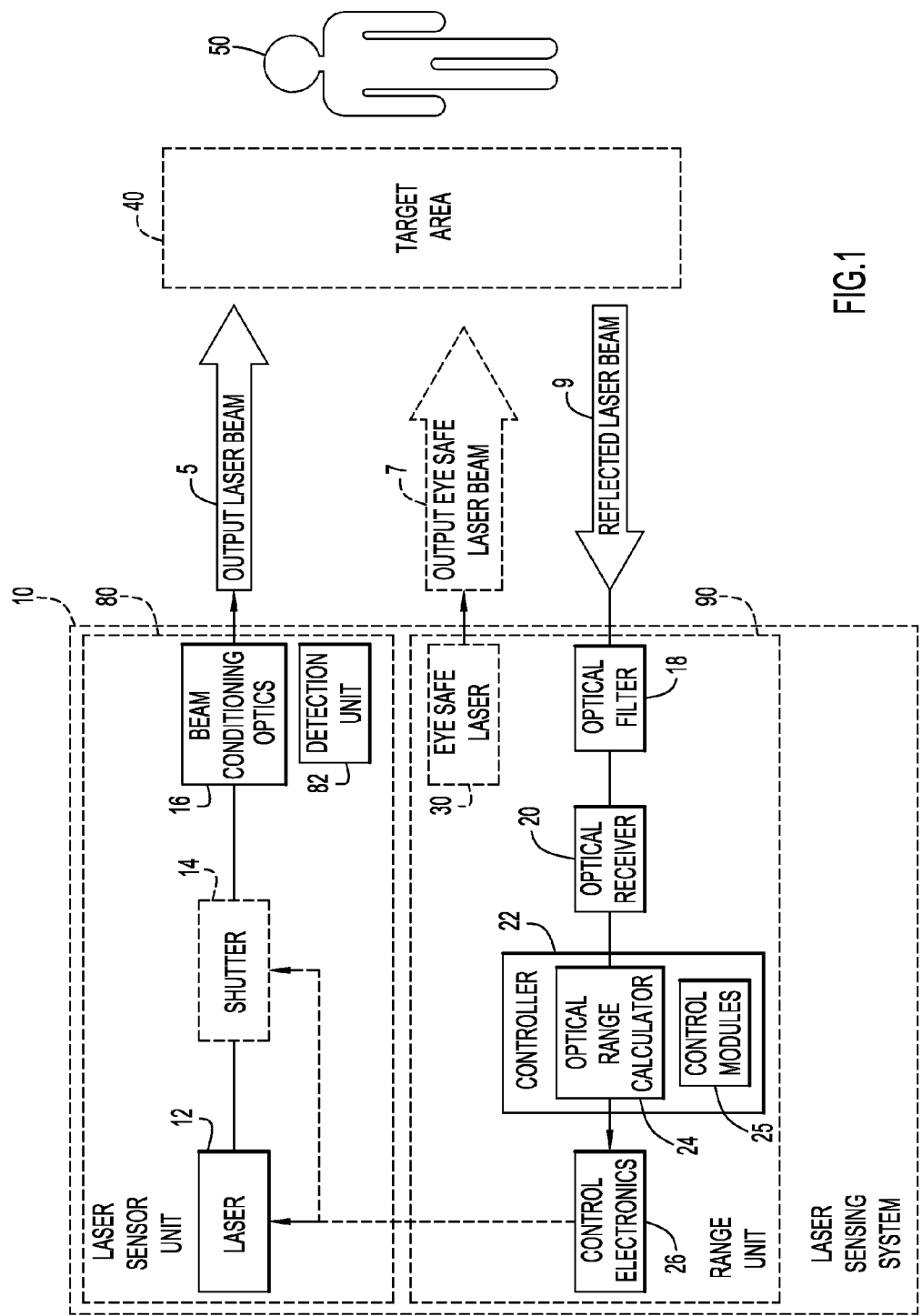
FIG. 1 is a block diagram of an example laser sensing system controlling emissions of non-eye-safe laser beams according to an embodiment of the present invention.

Present invention embodiments protect nearby persons or other objects (e.g., animals, etc.) that are outside an operating range of a laser sensing system by disabling transmission of a non-eye-safe laser beam. The beam transmission is disabled (e.g., including interruption or termination of the non-eye-safe laser beam, or modifying the non-eye-safe laser beam to be eye-safe) in response to no detection of a hard or intended target (e.g., including solid substances and non-solid but optically opaque substances (e.g., a liquid, a gas, a cloud, etc.) that stops the non-eye-safe laser beam (e.g., or attenuates it sufficiently to render it eye-safe)) within the operating range of the laser sensing system, or when an object is detected between the laser sensing system and the spatial interval that defines the operating range. For example, if the operating range of a laser sensing system is 0.5 to 3.5 meters, and the range to a reflecting or scattering surface impacted by a transmitted laser beam is determined to be less than 0.5 meters or greater than 3.5 meters, transmission of the non-eye-safe laser is disabled until the measured range is within the laser sensing system operating range. However, when the target surface is determined to be at 2.5 meters (or within the operating range), a controller adaptively limits the operating range to an interval of a preset width centered on 2.5 meters (e.g., 2.5+/−0.5 meters). If any object is detected outside of this adaptive operating range (e.g., 2.0-3.0 meters), transmission of the non-eye-safe laser is disabled until the object is no longer detected.

The operating range of the laser sensing system may be determined from intrinsic hardware limitations (e.g. the laser sensing system is unable to efficiently detect outside a given spatial interval based upon its optical design) and/or an adaptive controller (e.g. when a target surface is detected within the operating range, the laser sensing system may automatically limit the operating range to a smaller spatial interval enclosing the target in order to enhance eye-safety by disabling transmission of the non-eye-safe laser when an object is detected outside that adaptive operating range). The controller may adaptively track the target distance to change the location (and possibly, width) of the adaptive spatial interval defining the operating range as the distance from the laser sensor to the target surface under investigation varies. The controller may autonomously control the extent of the operating range (e.g., based upon three dimensional (3-D) mapping of the entire target, or the user may be allowed to enter information to better define the operating range for a given interrogation scenario).

Present invention embodiments do not provide protection for persons within the operating range of the laser sensing system (since other devices such as passive infrared detectors may be used for that purpose), and do not protect against specular reflections or scattering of the non-eye-safe laser beam from a target within the operating range.

An example laser sensing system controlling emissions of non-eye-safe laser beams according to an embodiment of the present invention is illustrated in FIG. 1. Specifically, laser sensing system 10 includes a laser sensor unit 80 to interrogate an intended target, and a range unit 90 to control laser emissions based on a range measurement to an object. Laser sensor unit 80 includes a laser 12, beam conditioning optics 16, and a detection unit 82. In addition, the laser sensor unit may include a shutter 14 (which may be incorporated into or an intrinsic part of the electronics or optical design of the laser rather than an auxiliary device) to control emissions as described below. Laser 12 may be implemented by any conventional or other device providing a suitable laser beam. The laser beam from laser 12 is typically a non-eye-safe laser beam utilized for sensing applications. Shutter 14 is disposed between laser 12 and beam conditioning optics 16 to enable and/or prevent transmission of the laser beam from laser 12 therethrough. The shutter may be implemented by any conventional or other light stoppage devices (e.g., shutters, blinds, polarized or other filters, movable panel, etc.), and may be constructed of any suitable materials sufficiently opaque or with other optical properties (e.g., polarization, filters, reflectivity, etc.) to prevent transmission therethrough of the laser beam from laser 12.

Beam conditioning optics 16 shape the profile (e.g., shape, energy distribution, etc.) of the laser beam from laser 12. The beam conditioning optics may be implemented by any conventional or other optical devices (e.g., lenses, prisms, filters, etc.) to shape the profile (e.g., shape, energy distribution, etc.) of a laser beam. The shaped laser beam from beam conditioning optics 16 serves as a non-eye-safe output laser beam 5. The non-eye-safe output laser beam is transmitted from laser sensing system 10 toward a target area 40 representing the operating range of the laser sensing system to interrogate a target substance (e.g., a chemical droplet, biological material, an explosive residue on a wall, table, vehicle exterior, or the ground, etc.).

In order to protect a nearby person 50 or other objects (e.g., animals, etc.) that are outside target area 40 (representing the operating range of laser sensing system 10), transmission of the non-eye-safe laser beam from laser 12 is disabled (e.g., via shutter 14 or disabling power to laser 12) in response to detection of these objects. Initially, laser sensing system 10 (with shutter 14 configured to enable passage of the laser beam therethrough) transmits output laser beam 5 toward an intended target within target area 40. When output laser beam 5 impacts a hard target or surface, the beam is reflected, scattered, or re-emitted back toward laser sensing system 10 as reflected laser beam 9. The reflected laser beam is used by detection unit 82 to interrogate the hard target, and may further be used by range unit 90 to measure the range to the surface that intercepts the transmitted laser beam. Detection unit 82 includes various components (not shown) (e.g., a receiver, filter, processor, etc.) to receive and process a beam reflected from the hard target for interrogation of that target.

Range unit 90 receives and processes reflected beam 9 to determine the range to the hard target. In particular, range unit 90 includes an optical filter 18, an optical receiver 20, a processor 22, and control electronics 26. Optical filter 18 receives reflected beam 9, and filters the reflected beam to remove spurious signals (e.g., provide a beam within a band expected for the reflected beam). The optical filter may be implemented by any conventional or other optical filtering devices (e.g., lenses, prisms, filters, etc.).

The filtered beam is received by optical receiver 20. The optical receiver preferably includes a charge-coupled device (CCD) array, and provides digital information concerning the received beam to controller 22. However, the optical receiver may include any conventional or other devices receiving optical signals (e.g., CCD or other arrays, etc.). The digital information for the received laser beam is provided to controller 22 for analysis. The controller may be implemented by any conventional or other processing device (e.g., processor, controller, etc.). Controller 22 includes an optical range calculator module 24 to analyze the digital information pertaining to the received beam and determine a range of an impacted target. The optical range calculation module may be implemented by any quantity of hardware and/or software modules.

Initially, controller 22 (e.g., via optical range calculator module 24) analyzes the digital information to determine detection of a valid beam. This may be accomplished by comparing elements of the CCD array of optical receiver 20 to one or more threshold values (e.g., relating to an energy level of the element to indicate detection of a beam, the amount of elements needed to exceed the threshold for validation of a beam, etc.).

Once a valid beam is detected, the controller determines the range of the impacted target. This may be determined in any suitable fashion. For example, time of flight techniques may be utilized to determine the range. In this case, controller 22 (e.g., via optical range calculator module 24) maintains a transmission time for each output beam 5, and a reception time for each received reflected beam 9. Controller 22 (e.g., via optical range calculator module 24) may detect transmission and reception of beams to record the transmission and reception times for those beams.

Once a valid beam is received, controller 22 (e.g., via optical range calculator module 24) retrieves the corresponding transmission and reception times for the received beam. The transmission and reception times are utilized to determine the round trip time for a beam to travel from laser sensing system 10 to the impacted target surface, and to return to the laser sensing system (e.g., difference between the reception and transmission times associated with the received beam). The round trip time is utilized in combination with the known speed of the laser beam (or speed of light) to determine the distance or range to the impacted target (e.g., Range=0.5* (Round Trip Time*Speed of the beam)).

Alternatively, triangulation techniques may be utilized to determine the range to the impacted target. In this case, controller 22 (e.g., via optical range calculator module 24) analyzes the digital information from optical receiver 20 to determine an angle of the received beam on the CCD array of the optical receiver. The optical receiver is preferably located at a known distance, D, from, and oriented at an angular position relative to, the optical axis (or beam transmission axis) of laser sensing system 10. This angular positioning enables the optical receiver to capture the angle of the reflected beam relative to the optical axis of the laser sensing system. Since the angle of the reflected beam varies with the distance to the impacted target, different parts of the CCD array of optical receiver 20 are impacted by the reflected beam depending upon that distance (and angle). Accordingly, the angle of the reflected beam, $A_{REF}$, relative to the optical axis may be determined based on the location and/or arrangement of the particular elements of the CCD array detecting the reflected beam. The determined angle, $A_{REF}$, and known distance, D, are utilized to determine the distance or range to the impacted target via triangulation techniques. For example, a right triangle may represent the relationship between the range, angle, and known distance, where a side (other than the hypotenuse) opposite the determined angle represents the known distance, D, and another side (other than the hypotenuse) adjacent the determined angle represents the range to the impacted target along the optical axis. Accordingly, the range may be determined from this right triangle representation based on the tangent function (e.g., $\tan(A_{REF})$=D/Range, or Range=D/($\tan(A_{REF})$)). Other range-measurement techniques, as are well known in the art (e.g., such as those involving pseudo random amplitude modulation of the output laser beam), may be employed.

Controller 22 (e.g., via optical range calculator module 24) compares the determined range value to the spatial interval defining the operating range for laser sensing system 10. When the range value is outside the laser sensing system operating range (e.g., an object is either between laser sensing system 10 and target area 40, or beyond target area 40) control electronics 26 disable transmission of the non-eye-safe laser beam. Control electronics 26 may include any conventional or other circuitry (e.g., relays, switches, etc.) to disable transmission of the non-eye-safe laser beam. For example, control electronics 26 may control shutter 14 to prevent transmission therethrough of the laser beam from laser 12. Alternatively, control electronics 26 may terminate power or otherwise disable laser 12. In this case, laser sensing system 10 may be configured without shutter 14.

Since the beam from laser 12 is used for determining the range, the laser is subsequently enabled in a range mode and pulsed in order to obtain subsequent range measurements. When the range to an impacted target is within an acceptable range (or the operating range of laser sensing system 10), laser 12 is enabled to interrogate the target (until an object outside the operating range of the laser sensing system is detected as described above).

Laser sensing system 10 may alternatively employ an eye-safe laser source for a range determination. In this case, laser sensor unit 80 includes laser 12 for interrogation of an intended target, and range unit 90 includes an eye-safe laser source 30 for range determinations. Eye-safe laser source 30 may be implemented by any conventional or other device providing a suitable laser beam. In this case, eye-safe laser source 30 transmits an eye-safe output laser beam 7 toward an intended target within target area 40 (representing the operating range of laser sensing system 10), where the eye-safe laser source is positioned to transmit the eye-safe laser beam substantially along the optical axis of the laser sensing system (or transmission of non-eye-safe output laser beam 5). The transmitted eye-safe laser beam is used to determine the range to objects (e.g., person 50, etc.) outside target area 40 (representing the operating range of laser sensing system 10). When eye-safe output laser beam 7 impacts a hard target or surface, the beam is reflected back toward laser sensing system 10 as reflected laser beam 9.

Optical filter 18 and optical receiver 20 of range unit 90 are configured to accommodate the eye-safe laser beam. The optical filter receives and filters the reflected beam to remove spurious signals (e.g., provide a beam in the band expected for the reflected beam). Optical receiver 20 provides digital information concerning the received beam to controller 22 for analysis. Initially, controller 22 (e.g., via optical range calculator module 24) analyzes the digital information to determine detection of a valid beam. This may be accomplished by comparing elements of the CCD array of optical receiver 20 to one or more threshold values (e.g., relating to an energy level of the element to indicate detection of a beam, the amount of elements needed to exceed the threshold for validation of a beam, etc.).

Once a valid beam is detected, the controller determines the range of the impacted target. This may be determined in any suitable fashion. For example, time of flight techniques may be utilized to determine the range as described above. In this case, controller 22 determines the round trip time of the eye-safe laser beam to travel from laser sensing system 10 to the impacted target surface, and to return to the laser sensing system (e.g., difference between the reception and transmission times associated with the received eye-safe laser beam). The round trip time is utilized in combination with the known speed of the laser beam (or speed of light) to determine the distance or range to the impacted target (e.g., Range=0.5* (Round Trip Time*Speed of the beam)) as described above.

Alternatively, triangulation techniques may be utilized to determine the range to the impacted target. In this case, controller 22 (e.g., via optical range calculator module 24) analyzes the digital information from optical receiver 20 to determine an angle of the received eye-safe laser beam on the CCD array of the optical receiver. The optical receiver is preferably located at a known distance, D, from, and oriented at an angular position relative to, the optical axis (or beam transmission axis) of laser source 30 (and laser sensor unit 80). This angular positioning enables the optical receiver to capture the angle of the reflected beam relative to the optical axis of the laser sensing system. The angle of the reflected beam, $A_{REF}$, relative to the optical axis may be determined based on the location and/or arrangement of the particular elements of the CCD array detecting the reflected beam as described above. The determined angle, $A_{REF}$, and known distance, D, are utilized to determine the distance or range to the impacted target via triangulation techniques (e.g., Range=D/(tan ($A_{REF}$)) as described above.

Controller 22 (e.g., via optical range calculator module 24) compares the determined range value to the spatial interval defining the operating range for the laser sensing system. When the range value is outside the laser sensing system operating range (e.g., an object is either between laser sensing system 10 and target area 40, or beyond target area 40), control electronics 26 disable transmission of the non-eye-safe laser beam as described above. For example, control electronics 26 may control shutter 14 to prevent transmission therethrough of the laser beam from laser 12, or terminate power or otherwise disable laser 12 (e.g., without shutter 14). Eye-safe laser source 30 remains enabled for range determinations even though transmissions from laser 12 may be disabled. When the range to an impacted target is within an acceptable range (or the operating range of laser sensing system 10), laser 12 is enabled to interrogate an intended target (until an object outside the operating range of the laser sensing system is detected as described above). The emission of laser 12 may be modified to function as the eye-safe laser in this system, though it may not be able to provide sensing data. In this case, instead of laser 12 being disabled, its output properties are modified to be eye-safe, and it may continue to be used solely for rangefinding until it is re-enabled for non-eye-safe sensing.

Controller 22 (e.g., via one or more control modules 25) may further automatically define a narrow spatial interval around a measured target location in order to limit the operating range for laser sensing system 10. In this case, controller 22 may utilize the range determination to adaptively vary the location (and possibly width) of this spatial interval when the measured range is within the operating range of laser sensing system 10 (e.g., provide an interval or offset distance from the target (e.g., if the target range is 2.5 meters, an interval of +/−1 meter may be selected to provide an operating range 1.5-3.5 meters)). The spatial interval may be adjusted according to a variation in the range to the impacted target (as the relative distance between the impacted target and laser sensing system varies), or according to the target shape. Moreover, a user may enter information that predefines the operating range and overrides the operating range determination, or influences the determination of the operating range based upon user knowledge.

The range measurement may be performed by a separate unit (e.g., range unit 90) within the laser sensing system, or may be performed by one or more components of laser sensor unit 80.

Figure 2:
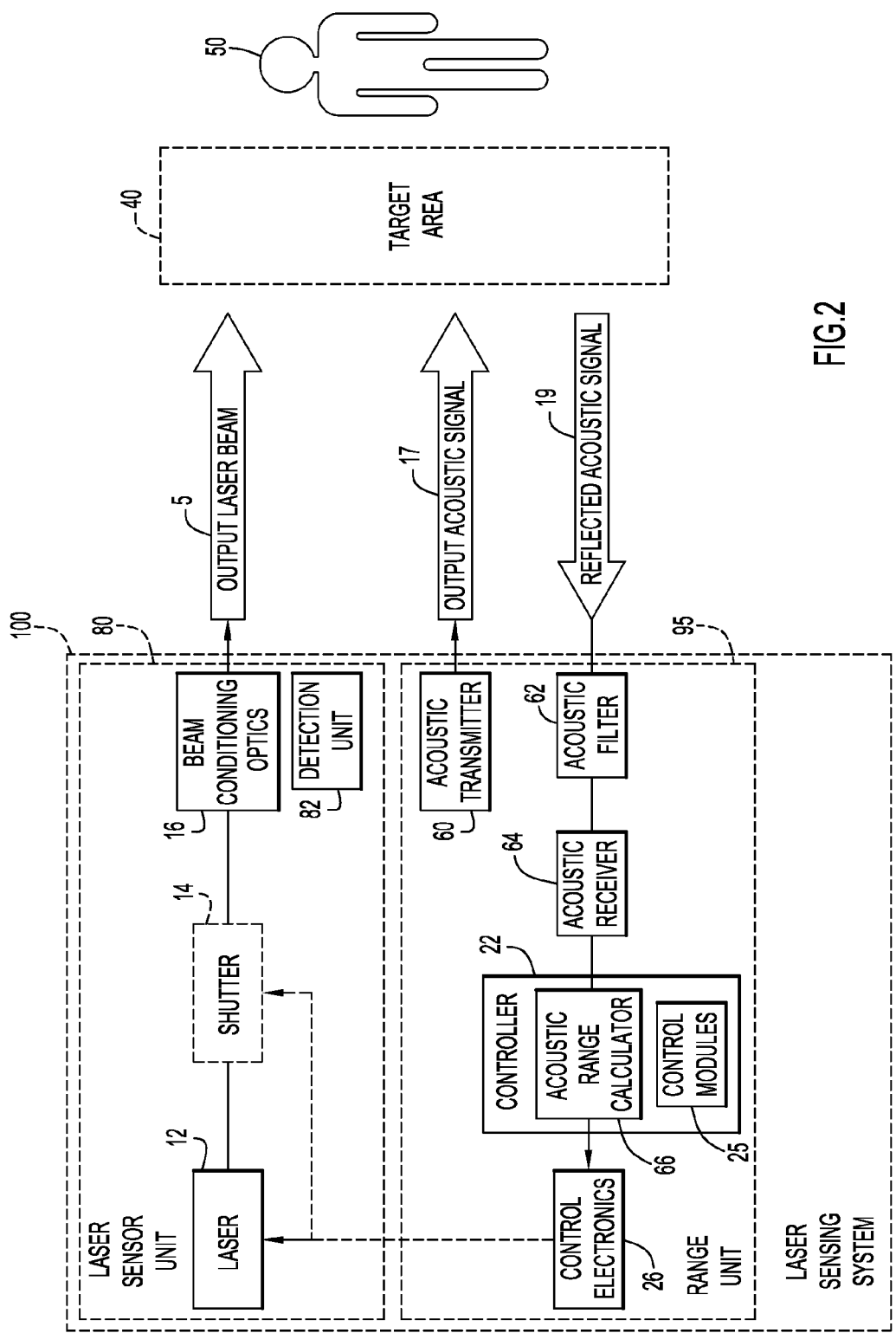
FIG. 2 is a block diagram of an example laser sensing system employing acoustic signals to control emissions of non-eye-safe laser beams according to an embodiment of the present invention.

An example laser sensing system controlling emissions of non-eye-safe laser beams and employing acoustic signals to determine the range to an impacted target is illustrated in FIG. 2. Specifically, laser sensing system 100 is similar to laser sensing system 10 described above and includes laser sensor unit 80 to interrogate an intended target, and a range unit 95 to control laser emissions based on a range measurement to an object. Laser sensor unit 80 is substantially similar to the laser sensor unit described above, and includes laser 12, beam conditioning optics 16, and detection unit 82. In addition, the laser sensor unit may include shutter 14 to control emissions. Laser 12, shutter 14, beam conditioning optics 16, and detection unit 82 are each substantially similar to the corresponding items described above.

The laser beam from laser 12 is typically a non-eye-safe laser beam utilized for sensing applications as described above. Shutter 14 is disposed between laser 12 and beam conditioning optics 16 to enable and/or prevent transmission of the laser beam from laser 12 therethrough. Beam conditioning optics 16 shape the profile (e.g., shape, energy distribution, etc.) of the laser beam from laser 12, where the shaped laser beam from beam conditioning optics 16 serves as non-eye-safe output laser beam 5 as described above. The non-eye-safe output laser beam is transmitted from laser sensing system 100 toward target area 40 representing the operating range of laser sensing system 100 to interrogate a target substance (e.g., a chemical droplet, biological material, an explosive residue on a wall, table, vehicle exterior, or the ground, etc.) as described above.

In order to protect a nearby person 50 or other objects (e.g., animals, etc.) that are outside target area 40 (representing the operating range of laser sensing system 100), transmission of the non-eye-safe laser beam from laser 12 is disabled (e.g., via shutter 14 or disabling power to laser 12) in response to detection of these objects. Initially, laser sensing system 100 (with shutter 14 configured to enable passage of the laser beam therethrough) transmits output laser beam 5 toward an intended target within target area 40. When output laser beam 5 impacts a hard target or surface, the beam is reflected back toward laser sensing system 100. Detection unit 82 includes various components (not shown) (e.g., a receiver, filter, processor, etc.) to receive and process the beam reflected from the hard target for interrogation of that target as described above.

Range unit 95 is operationally similar to range unit 90 described above, and determines the range to the hard target. In particular, range unit 90 includes an acoustic transmitter 60, an acoustic filter 62, an acoustic receiver 64, processor 22, and control electronics 26. Processor 22 and control electronics 26 are substantially similar to the corresponding items described above. Acoustic transmitter 60 provides an acoustic signal for range determinations. The acoustic transmitter may be implemented by any conventional or other device providing a suitable acoustic signal. In this case, acoustic transmitter 60 transmits an output acoustic signal 17 toward target area 40. When output acoustic signal 17 impacts a hard target or surface, the acoustic signal is reflected back toward laser sensing system 100 as reflected acoustic signal 19.

Acoustic filter 62 receives the reflected acoustic signal, and filters the reflected acoustic signal to remove spurious signals (e.g., provide a filtered signal within a band expected for the reflected signal). The acoustic filter may be implemented by any conventional or other filtering devices (e.g., high pass, low pass, band pass, etc.).

The filtered signal is received by acoustic receiver 64. The acoustic receiver preferably includes a microphone (e.g., with a digitizer), and provides digital information concerning the received signal to controller 22. However, the acoustic receiver may include any conventional or other devices receiving acoustic signals (e.g., microphones, etc.). The digital information for the received acoustic signal is provided to controller 22 for analysis. Controller 22 includes an acoustic range calculator module 66 to analyze the digital information pertaining to the received acoustic signal and determine a range of an impacted target. The acoustic range calculation module may be implemented by any quantity of hardware and/or software modules.

Initially, controller 22 (e.g., via acoustic range calculator module 66) analyzes the digital information to determine detection of a valid acoustic signal. This may be accomplished by comparing the digital information to one or more threshold values (e.g., relating to an energy level to indicate detection of an acoustic signal, etc.).

Once a valid signal is detected, the controller determines the range of the impacted target. This may be determined in any suitable fashion. For example, time of flight techniques may be utilized to determine the range. In this case, controller 22 (e.g., via acoustic range calculator module 66) maintains a transmission time for each output acoustic signal 17, and a reception time for each received reflected acoustic signal 19. Controller 22 (e.g., via acoustic range calculator module 66) may detect the transmission and reception of acoustic signals to record the transmission and reception times for those signals.

Once a valid acoustic signal is received, controller 22 (e.g., via acoustic range calculator module 66) retrieves the corresponding transmission and reception times for the received signal. The transmission and reception times are utilized to determine the round trip time for an acoustic signal to travel from laser sensing system 100 to the impacted target, and to return to the laser sensing system (e.g., the difference between the reception and transmission times associated with the received signal). The round trip time is utilized in combination with the known speed of the acoustic signal (or speed of sound) to determine the distance or range to the impacted target (e.g., Range=0.5*(Round Trip Time*Speed of the acoustic signal)).

Alternatively, triangulation techniques may be utilized to determine the range to the impacted target. In this case, acoustic receiver 64 may include a directional microphone, where controller 22 (e.g., via acoustic range calculator module 66) analyzes the digital information from acoustic receiver 64 to determine an angle, $A_{REF}$, of the received signal. The acoustic receiver is preferably located at a known distance, D, from, and oriented at an angular position relative to, the transmission axis of acoustic transmitter 60. The determined angle, $A_{REF}$, and known distance, D, are utilized to determine the distance or range to the impacted target via triangulation techniques (e.g., Range=D/(tan($A_{REF}$)) in substantially the same manner described above.

Controller 22 (e.g., via acoustic range calculator module 66) compares the determined range value to the spatial interval defining the operating range for laser sensing system 100. When the range value is outside the laser sensing system operating range (e.g., an object is either between laser sensing system 100 and target area 40, or beyond target area 40) control electronics 26 disable transmission of the non-eye-safe laser beam. For example, control electronics 26 may control shutter 14 to prevent transmission therethrough of the laser beam from laser 12. Alternatively, control electronics 26 may terminate power or otherwise disable laser 12. In this case, laser sensing system 100 may be configured without shutter 14.

The acoustic transmitter remains active to enable the range determination to control transmission of the non-eye-safe laser beam. When the range to an impacted target is within an acceptable range (or the operating range of laser sensing system 100), laser 12 is enabled in a mode to interrogate the target (until an object outside the operating range of the laser sensing system is detected as described above).

Controller 22 (e.g., via one or more control modules 25) may further automatically define a narrow spatial interval around a measured target location in order to limit the operating range for laser sensing system 100 in substantially the same manner described above. In this case, controller 22 may utilize the range determination to adaptively vary the location (and possibly width) of this spatial interval when the measured range is within the operating range of laser sensing system 100 (e.g., provide an interval or offset distance from the target (e.g., if the target range is 2.5 meters, an interval of +/−1 meter may be selected to provide an operating range 1.5-3.5 meters)). The spatial interval may be adjusted according to a variation in the range to the impacted target (as the relative distance between the impacted target and laser sensing system varies), or according to the target shape. Moreover, a user may enter information that predefines the operating range and overrides the operating range determination, or influences the determination of the operating range based upon user knowledge.

The range measurements may be performed by a separate unit (e.g., range unit 95) within laser sensing system 100, or may be performed by one or more components of laser sensor unit 80.

Figure 3:
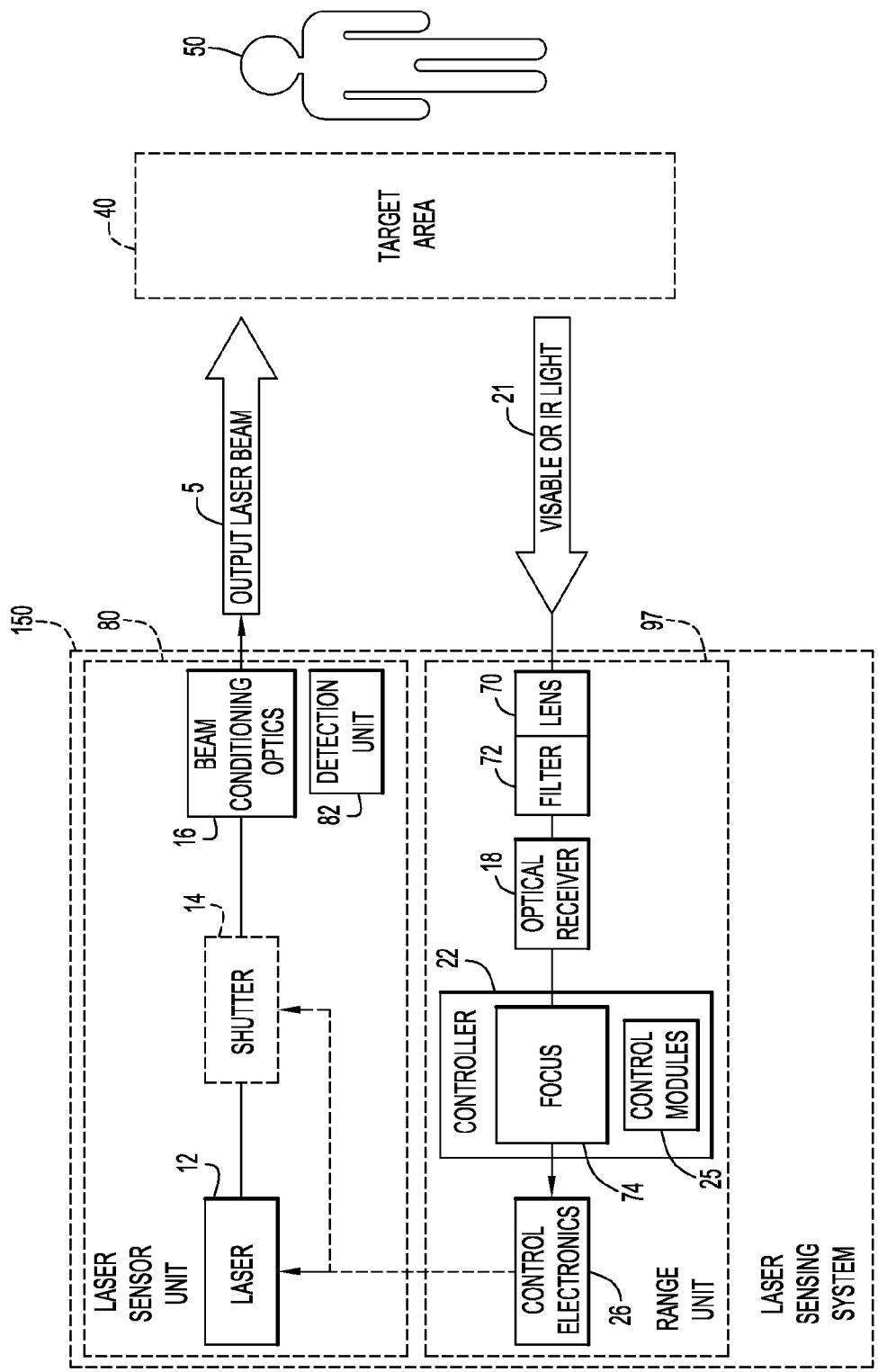
FIG. 3 is a block diagram of an example laser sensing system employing image processing to control emissions of non-eye-safe laser beams according to an embodiment of the present invention.

An example laser sensing system controlling emissions of non-eye-safe laser beams and employing image processing to determine the range to an impacted target is illustrated in FIG. 3. Specifically, laser sensing system 150 is similar to laser sensing systems 10, 100 described above and includes laser sensor unit 80 to interrogate an intended target, and a range unit 97 to control laser emissions based on a range measurement to an object. Laser sensor unit 80 is substantially similar to the laser sensor unit described above, and includes laser 12, beam conditioning optics 16, and detection unit 82. In addition, the laser sensor unit may include shutter 14 to control emissions. Laser 12, shutter 14, beam conditioning optics 16, and detection unit 82 are each substantially similar to the corresponding items described above.

The laser beam from laser 12 is typically a non-eye-safe laser beam utilized for sensing applications as described above. Shutter 14 is disposed between laser 12 and beam conditioning optics 16 to enable and/or prevent transmission of the laser beam from laser 12 therethrough. Beam conditioning optics 16 shape the profile (e.g., shape, energy distribution, etc.) of the laser beam from laser 12, where the shaped laser beam from beam conditioning optics 16 serves as non-eye-safe output laser beam 5 as described above. The non-eye-safe output laser beam is transmitted from laser sensing system 150 toward target area 40 representing the operating range of laser sensing system 150 to interrogate a target substance (e.g., a chemical droplet, biological material, an explosive residue on a wall, table, vehicle exterior, or the ground, etc.) as described above.

In order to protect a nearby person 50 or other objects (e.g., animals, etc.) that are outside target area 40 (representing the operating range of laser sensing system 150), transmission of the non-eye-safe laser beam from laser 12 is disabled (e.g., via shutter 14 or disabling power to laser 12) in response to detection of these objects. Initially, laser sensing system 150 (with shutter 14 configured to enable passage of the laser beam therethrough) transmits output laser beam 5 toward an intended target within target area 40. When output laser beam 5 impacts a hard target or surface, the beam is reflected back toward laser sensing system 150. Detection unit 82 includes various components (not shown) (e.g., a receiver, filter, processor, etc.) to receive and process the beam reflected from the hard target for interrogation of that target, as described above.

Range unit 97 is operationally similar to range units 90, 95 described above, and determines the range to the hard target. In particular, range unit 97 includes a lens 70, a filter 72, optical receiver 18, controller 22, and control electronics 26. Optical receiver 18, processor 22, and control electronics 26 are substantially similar to the corresponding items described above. Lens 70 is pointed towards target area 40, and receives ambient or other light signals 21 (e.g., visible light, infrared, etc.) to produce an image of a hard target on the CCD array of optical receiver 18. The lens may be implemented by any conventional or other optical devices (e.g., lens, etc.) to produce an image. The lens is expandable or movable in the direction of the target area in order to focus the image, where the positions of the lens expansions are calibrated to the range of an object being imaged. In other words, the positions of the various expansions of the lens each correspond to a particular range. The image focus is used to position the lens and determine the range to objects (e.g., person 50, etc.) as described below.

Filter 72 receives the image signals from lens 70 and filters the image signals to remove spurious signals. The filter may be implemented by any conventional or other optical filtering devices (e.g., lenses, prisms, etc.). The filtered signals are received by optical receiver 18 and produce an image within the CCD array. The digital image information is provided to controller 22 for analysis. Controller 22 includes a focus module 74 to analyze the digital image information and determine a range of an impacted target. The focus module may be implemented by any quantity of hardware and/or software modules.

Initially, controller 22 (e.g., via focus module 74) analyzes the digital image information to determine the presence of an object. This may be accomplished by image processing techniques (e.g., when no objects are detected, continued operation of the non-eye-safe laser is maintained).

Once the presence of an object is detected, the controller determines the range of the detected object. In particular, controller 22 (e.g., via focus module 74) analyzes the digital image information from optical receiver 18 in order to focus lens 70. Basically, controller 22 implements an auto focus feature of a digital camera, and dithers the optical focus of lens 70 from out of focus, through focus, and to out of focus to generate a series of digital images. The controller analyzes the resulting digital images to determine the best focus point for an object via conventional image processing techniques (e.g., edge processing, etc.). The corresponding lens position associated with the best focus point is utilized to determine the range to the object based on the calibration of lens position to range described above.

Controller 22 (e.g., via focus module 74) compares the determined range value to the spatial interval defining the operating range for laser sensing system 150. When the range value is outside the laser sensor operating range (e.g., an object is either between laser sensing system 150 and target area 40, or beyond target area 40), control electronics 26 disable transmission of the non-eye-safe laser beam. For example, control electronics 26 may control shutter 14 to prevent transmission therethrough of the laser beam from laser 12. Alternatively, control electronics 26 may terminate power or otherwise disable laser 12. In this case, laser sensing system 150 may be configured without shutter 14.

The lens focusing remains active to enable the range determination to control transmission of the non-eye-safe laser beam. When the range to an impacted target is within an acceptable range (or the operating range of laser sensing system 150), laser 12 is enabled in a mode to interrogate an intended target (until an object outside the operating range of the laser sensing system is detected as described above).

Controller 22 (e.g., via one or more control modules 25) may further automatically define a narrow spatial interval around a measured target location in order to limit the operating range for laser sensing system 150 in substantially the same manner described above. In this case, controller 22 may utilize the range determination to adaptively vary the location (and possibly width) of this spatial interval when the measured range is within the operating range of laser sensing system 150 (e.g., provide an interval or offset distance from the target (e.g., if the target range is 2.5 meters, an interval of +/−1 meter may be selected to provide an operating range 1.5-3.5 meters)). The spatial interval may be adjusted according to a variation in the range to the impacted target (as the relative distance between the impacted target and laser sensing system varies), or according to the target shape. Moreover, a user may enter information that predefines the operating range and overrides the operating range determination, or influences the determination of the operating range based upon user knowledge.

The range measurements may be performed by a separate unit (e.g., range unit 97) within laser sensing system 150, or may be performed by one or more components of laser sensor unit 80. Other rangefinding systems are known in the art, such as millimeter wave radar, and may be incorporated into the present invention embodiments.

Figure 4:
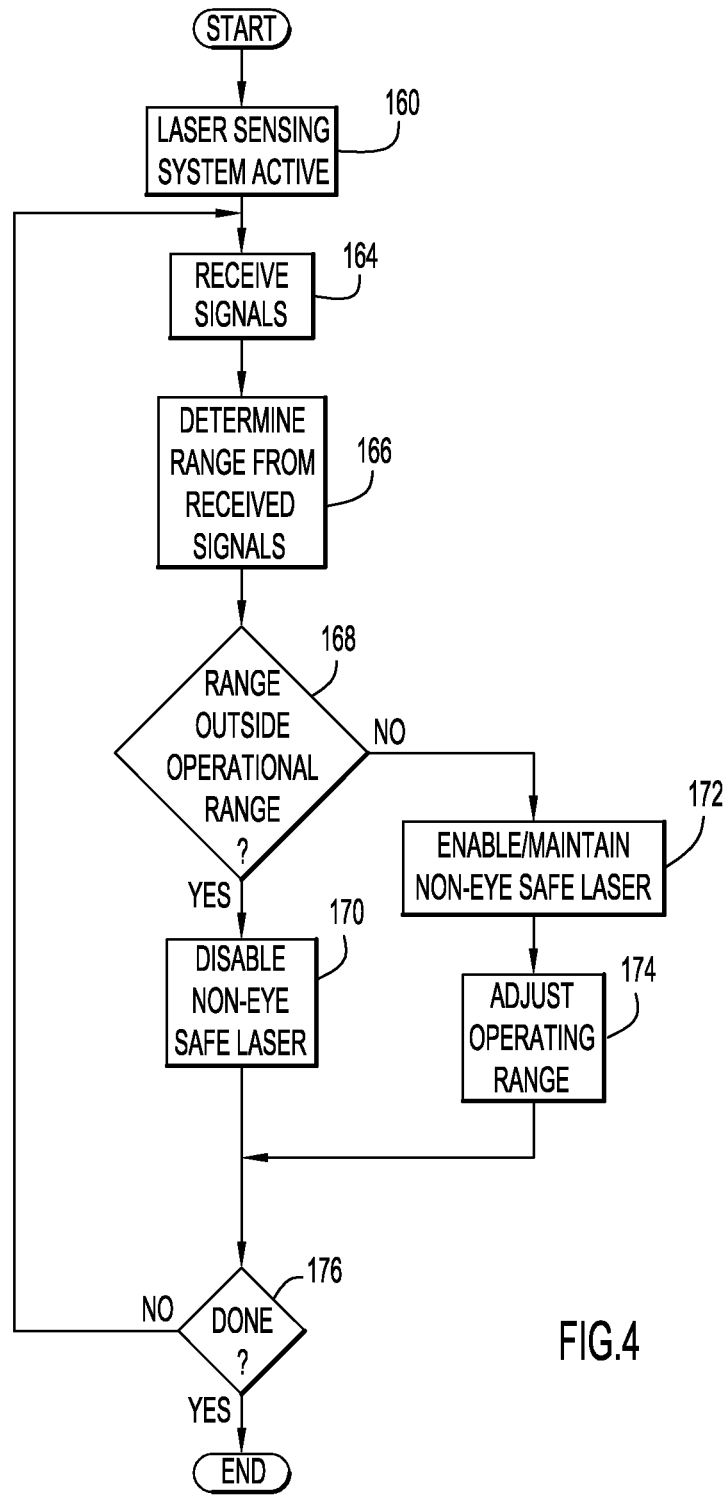
FIG. 4 is a procedural flow chart illustrating a manner of controlling emissions of non-eye-safe laser beams according to an embodiment of the present invention.

A manner of controlling emissions of non-eye-safe laser beams is illustrated in FIG. 4. Initially, a laser sensing or other system (e.g., laser sensing system 10, 100, or 150) is active and emitting non-eye-safe laser beams at step 160. Signals (e.g., reflected laser beams 7, 9, reflected acoustic signal 19, ambient or other light signals 21, etc.) enabling range determination to an object are received at the laser sensing or other system at step 164. The signals are analyzed to determine the range (e.g., via round trip time, triangulation, image processing, etc.) to an object at step 166.

When the range value is outside the operating range of the laser sensing or other system (e.g., an object is either between the system and the beginning of the system operating range, or beyond the system operating range) as determined at step 168, transmission of the non-eye-safe laser beam is disabled at step 170 (e.g., shutter 14 or other object may prevent transmission therethrough of the laser beam, power may be terminated to a system laser, the beam may be modified to be eye-safe, etc.). When the range value is within an acceptable range (e.g., or the operating range of the laser sensing or other system), transmission of the non-eye-safe laser is enabled (until an object outside the operating range of the laser sensing or other system is detected). In addition, the operating range of the laser sensing or other system may automatically be adjusted to define a narrow spatial interval around a measured object location at step 174 (e.g., provide an interval or offset distance from the object (e.g., if the object range is 2.5 meters, an interval of +/−1 meter may be selected to provide an operating range 1.5-3.5 meters)). The above process is repeated until a terminating condition (e.g., power down, etc.) occurs as determined at step 176.

It will be appreciated that the embodiments described above and illustrated in the drawings represent only a few of the many ways of implementing a method and apparatus for controlling laser transmissions for enhanced safety.

The range measurements of present invention embodiments may be employed within any suitable devices to control emissions of laser or other potentially harmful signals (e.g., transmitting devices, receiving devices, transceiving devices, etc.), and may be utilized with transmitted signals of any desired energy (e.g., light, laser, signals of any frequency or wavelength, etc.). The laser sensing or other systems may include any quantity of laser sensor and/or range units, and may have any operating ranges for illuminating intended targets. The range units may be employed within any laser or other system transmitting potentially harmful or hazardous signals to control emissions of those signals. For example, a range unit may be employed within this type of system to disable (or render non-hazardous) transmission of signals from a laser or other unit transmitting these potentially harmful or hazardous signals from the system.

The components of the laser sensor unit may be arranged in any fashion to interrogate objects and control emissions. The laser may be may be implemented by any quantity of any conventional or other devices providing a suitable laser beam with any desired properties (e.g., any spectral region, wavelength, frequency, power, etc.). The shutter may be implemented by any quantity of any conventional or other light stoppage devices (e.g., shutters, blinds, polarized or other filters, movable panel, etc.), and may be constructed of any suitable materials sufficiently opaque or with other optical properties (e.g., polarization, filters, reflectivity, etc.) to prevent transmission therethrough. The shutter may be arranged in any desired fashion relative to a laser or other light source to prevent transmission therethrough. The beam conditioning optics may be implemented by any conventional or other optical devices (e.g., lenses, prisms, filters, etc.) to shape the profile (e.g., shape, energy distribution, etc.) of a laser or other beam. The detection unit may include any quantity of any conventional or other components (e.g., a receiver, filter, processor, etc.) arranged in any fashion to receive and process a beam reflected from a hard target for interrogation of that target.

The components of the range units may be arranged in any fashion to control emissions. The eye-safe laser source may be implemented by any quantity of any conventional or other devices providing a suitable laser beam with any desired properties (e.g., any spectral region, wavelength, frequency, power, etc.). The optical filter may be implemented by any quantity of any conventional or other optical filtering devices (e.g., lenses, prisms, filters, etc.). The optical receiver may be implemented by, or include, any quantity of any conventional or other devices receiving optical signals (e.g., CCD or other elements or arrays, etc.). The control electronics may include any quantity of any conventional or other circuitry (e.g., processor, relays, switches, etc.) arranged in any fashion to disable transmission of the non-eye-safe laser beam.

The acoustic transmitter may be implemented by any quantity of any conventional or other device providing a suitable acoustic signal with any desired properties (e.g., frequency, etc.). The acoustic filter may be implemented by any quantity of any conventional or other filtering devices (e.g., high pass, low pass, band pass, etc.). The acoustic receiver may include any quantity of any conventional or other devices receiving acoustic signals (e.g., directional or other microphones, etc.).

The lens may be implemented by any quantity of any conventional or other optical devices arranged in any fashion (e.g., lens, filters, refractive devices, etc.) to produce an image. The lens may be movable in any suitable directions, and any positions of the lens may be correlated with range. The filter may be implemented by any quantity of any conventional or other optical filtering devices (e.g., lenses, prisms, etc.).

The range may be determined via any suitable conventional or other techniques in any suitable fashion (e.g., time of flight, triangulation, image processing, etc.). The received signals may be correlated with the transmitted signals for time of flight determinations in any desired fashion. For example, the transmitted and received signals may be associated with timestamps or other indicators. Further, the transmitted signals may be encoded with, or include properties to indicate, an identifier or transmission time information (e.g., frequency, wavelength, a type of modulation, etc.). Moreover, a signal may be transmitted and a time interval is provided to receive the corresponding reflected signal.

The triangulation technique may utilize any geometric and/or trigonometric properties (e.g., sine, cosine, tangent, properties of various shapes, etc.) to determine the range. The receiving devices (e.g., optical receiver, acoustic receiver, etc.) may be oriented at any suitable angular orientation relative to the optical or any other axis to measure the angle of a reflected signal. Alternatively, the laser sensing system may employ one or more additional signal sources and corresponding detectors to provide additional measurements for the triangulation.

The transmission of the non-eye-safe laser beam may be disabled in any desired fashion. For example, a shutter or other light impervious member may be utilized to block transmission of the beam. Further, power to the laser source may be interrupted to disable the transmission, or the power or intensity of the beam may be reduced to a safe level. In this case, the laser sensing system may be configured without the shutter. The transmission may be disabled for any desired time interval (e.g., predetermined time interval, until an object is not detected, etc.). The controller may directly interface appropriate components (e.g., laser, shutter, etc.) to disable the transmission (e.g., without need of the control electronics).

The controller may be implemented by any conventional or other processing device or computer system (e.g., processor, controller, etc.), and may include any software (e.g., optical range calculator module, acoustic range calculator module, focus module, control modules, etc.). The laser sensing or other system may include any types of displays and input devices (e.g., keyboard/keypad, touch screen, etc.) to enter and/or view information. The controller may utilize any conventional or other image or signal processing techniques to validate a received signal (e.g., image processing techniques, analyzing energy or magnitudes of the received signal information, etc.). The controller may maintain and retrieve transmission and/or reception times based on any suitable keys or other signal identifiers. The controller may adjust the operating range to include any suitable area encompassing the intended target based on any desired criteria (e.g., predefined offset, user entry of information, target range, etc.).

The controller may control the lens through any desired settings or setting ranges to produce images with various focus. The best focus may be determined by any conventional or other image processing techniques (e.g., edge processing, etc.). The lens positions may be correlated with any suitable ranges to determine the range or distance to an object.

It is to be understood that any software for the controller of present invention embodiments (e.g., optical range calculator module, acoustic range calculator module, focus module, control modules, etc.) may be implemented in any desired computer language and could be developed by one of ordinary skill in the computer arts based on the functional descriptions contained in the specification and flow chart illustrated in the drawings. Further, any references herein of software performing various functions generally refer to computer systems or processors performing those functions under software control. The controller of present invention embodiments may alternatively be implemented by any type of hardware and/or other processing circuitry. The various functions of the controller may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). The software and/or processes described above and illustrated in the flow chart may be modified in any manner that accomplishes the functions described herein. In addition, the functions in the flow chart or description may be performed in any order that accomplishes a desired operation.

The software of present invention embodiments (e.g., optical range calculator module, acoustic range calculator module, focus module, control modules, etc.) may be available on a program product apparatus or device including a recordable, computer readable or usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

It is to be understood that present invention embodiments are not limited to the applications described above, but may applied to any active sensor or other system (e.g., laser-based or non-eye-safe incoherent light source-based with a laser or light unit to transmit such signals) whose operating range is less than the safety exclusion zone for the transmitter. This includes all active optical sensors from the ultraviolet to the long wave infrared, including Raman-based sensors, Laser Induced Breakdown sensors, lidars, ladars, fluorescence sensors, photothermal sensors, and differential contrast imaging sensors, and Multiwavelength absorption-based sensors.

Non-eye-safe laser signals generally refer to laser signals that may cause biological damage, and are typically produced from lasers with properties substantially similar to those of various classifications (e.g., ANSI Z136 Classes 3a, 3b and 4; Federal Laser Product Performance Standard (FLPPS) Classes IIIa, IIIb, and 4; IEC 60825 Classes 3R, 3B, and 4; etc.). Eye-safe laser signals generally refer to laser signals that cause no, or minimal, biological damage, and are typically produced from lasers with properties substantially similar to those of various classifications (e.g., ANSI Z136 Classes 1 and 2; Federal Laser Product Performance Standard (FLPPS) Classes I and II; IEC 60825 Classes 1, 1M, 2, and 2M; etc.).

It is to be understood that the terms "top", "bottom", "front", "rear", "side", "height", "length", "width", "upper", "lower", "vertical" and the like are used herein merely to describe points of reference and do not limit the present invention to any particular orientation or configuration. In addition, the terms "comprises", "comprising", "includes", "including", "has", "have", "having", "with" and the like, when used in this specification and the claims, specify the presence of stated features, but do not preclude the presence or addition of one or more other features.

From the foregoing description, it will be appreciated that the invention makes available a novel method and apparatus for controlling laser transmissions (or other hazardous or undesirable transmissions such as, for example, from non-laser light sources, or acoustic, microwave or millimeter wave or x-ray sources) for enhanced safety, wherein transmissions of non-eye-safe laser signals from a laser sensing system are controlled to provide enhanced safety for nearby objects (e.g., persons, animals, etc.) situated outside the boundaries of the operating range of the laser sensing system.

Having described preferred embodiments of a new and improved method and apparatus for controlling laser transmissions for enhanced safety, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for interrogating an intended target via emission of signals comprising:
a signal unit to transmit signals for interrogating an intended target, wherein said system includes an operating range indicating a prescribed range of distance from said system for said intended target to be impacted by said transmitted signals for interrogation of said intended target;
a range unit to determine a range of an object from said system, compare said determined range to said operating range of said system, and control transmission of said signals based on said comparison of said determined range, wherein said range unit disables transmission of said signals in response to said object residing within an area outside of said operating range, wherein said area includes a first area with a range from said system less than said operating range and a second area with a range from said system greater than said operating range.

2. The system of claim 1, wherein said range unit includes:
a receiver to receive a range signal transmitted from said system and reflected from said object; and
a controller to determine said range based on said range signal and to control said transmission of said signals based on said determined range.

3. The system of claim 2, wherein said transmitted signals include hazardous signals.

4. The system of claim 3, wherein said hazardous signals include non-eye-safe laser signals.

5. The system of claim 4, wherein said range signal includes said non-eye-safe laser signals transmitted from said signal unit and reflected from said object.

6. The system of claim 3, wherein said range unit further includes:
a laser source to transmit eye-safe laser signals, wherein said range signal includes said eye-safe laser signals transmitted from said laser source and reflected from said object.

7. The system of claim 3, wherein said range unit further includes:
an acoustic transmitter to transmit acoustic signals, wherein said range signal includes said acoustic signals transmitted from said acoustic transmitter and reflected from said object.

8. The system of claim 3, wherein said controller includes:
a range module to determine said range based on a round trip time for said range signal to travel from said system to said object and to return to said system.

9. The system of claim 3, wherein said receiver is angularly positioned relative to an axis of transmission for said range signal, and said controller includes:
a range module to triangulate said range based on an angle of said reflected range signal relative to said axis of transmission.

10. The system of claim 3, wherein said range unit includes:
a lens to produce an image of said object, wherein said lens is manipulable to different positions to focus said image, and said different positions of said lens correlate to a corresponding range; and
a controller to determine said range based on said image and to control said transmission of said hazardous signals based on said determined range.

11. The system of claim 10, wherein said controller includes:
a focus module to control said lens to produce a series of images each with a different focus, to analyze said series of images to determine an image with the best focus, and to determine said range of said object based on said range correlated with said position of said lens producing said image with the best focus.

12. The system of claim 3, wherein said signal unit includes a shutter, and said range unit controls said shutter to block said hazardous signals in response to said determined range of said object residing outside of said operating range.

13. The system of claim 3, wherein said range unit includes:
a control unit to terminate power to said signal unit to disable transmission of said hazardous signals in response to said determined range of said object residing outside of said operating range.

14. The system of claim 1, wherein said range unit adjusts said operating range of said system to encompass said object and a surrounding area defined by an offset from said determined range in response to said determined range residing within said operating range of said system.

15. A method of interrogating an intended target via emission of signals comprising:
(a) transmitting signals from a system toward an intended target for interrogating said intended target, wherein transmission of said signals is associated with an operating range indicating a prescribed range of distance from said system for said intended target to be impacted by said transmitted signals for interrogation of said intended target;
(b) determining a range of an object from said system, and comparing said determined range to said operating range of said system; and
(c) controlling transmission of said signals based on said comparison of said determined range, wherein transmission of said signals from said system is disabled in response to said object residing within an area outside of said operating range, wherein said area includes a first area with a range from said system less than said operating range and a second area with a range from said system greater than said operating range.

16. The method of claim 15, wherein step (b) further includes:
(b.1) receiving a range signal transmitted from said system and reflected from said object and determining said range based on said range signal; and step (c) further includes:
(c.1) controlling said transmission of said signals based on said determined range.

17. The method of claim 16, wherein said transmitted signals include hazardous signals.

18. The method of claim 17, wherein said hazardous signals include non-eye-safe laser signals.

19. The method of claim 18, wherein said range signal includes said non-eye-safe laser signals transmitted from said system and reflected from said object.

20. The method of claim 17, wherein step (a) further includes:
(a.1) transmitting eye-safe laser signals from said system, wherein said range signal includes said eye-safe laser signals;
wherein step (b.1) further includes:
(b.1.1) receiving said eye-safe laser signals transmitted from said system and reflected from said object and determining said range based on said reflected eye-safe laser signals; and
wherein step (c.1) further includes:
(c.1.1) controlling said transmission of said hazardous signals based on said determined range.

21. The method of claim 17, wherein step (a) further includes:
(a.1) transmitting acoustic signals from said system, wherein said range signal includes said acoustic signals;
wherein step (b.1) further includes:
(b.1.1) receiving said acoustic signals transmitted from said system and reflected from said object and determining said range based on said reflected acoustic signals; and
wherein step (c.1) further includes:
(c.1.1) controlling said transmission of said hazardous signals based on said determined range.

22. The method of claim 17, wherein step (b.1) further includes:
(b.1.1) determining said range based on a round trip time for said range signal to travel from said system to said object and to return to said system.

23. The method of claim 17, wherein step (b.1) further includes:
(b.1.1) triangulating said range based on an angle of said reflected range signal relative to an axis of transmission of said range signal.

24. The method of claim 17, wherein said system includes a lens to produce an image of said object, wherein said lens is manipulable to different positions to focus said image, and said different positions of said lens correlate to a corresponding range, and step (b.1) further includes:
(b.1.1) determining said range based on said image.

25. The method of claim 24, wherein step (b.1.1) further includes:
(b.1.1.1) controlling said lens to produce a series of images each with a different focus;
(b.1.1.2) analyzing said series of images to determine an image with the best focus; and
(b.1.1.3) determining said range of said object based on said range correlated with said position of said lens producing said image with the best focus.

26. The method of claim 17, wherein said system includes a shutter, and step (c.1) further includes:
(c.1.1) controlling said shutter to block said hazardous signals in response to said determined range of said object residing outside of said operating range.

27. The method of claim 17, wherein step (c.1) further includes:
- (c.1.1) terminating power to disable transmission of said hazardous signals in response to said determined range of said object residing outside of said operating range.

28. The method of claim 15, further including:
- (d) adjusting said operating range to encompass said object and a surrounding area defined by an offset from said determined range in response to said determined range residing within said operating range.

29. The system of claim 3, wherein said range unit renders said hazardous signals to be non-hazardous to disable transmission of said hazardous signals in response to said determined range of said object residing outside of said operating range.

30. The method of claim 17, wherein step (c.1) further includes:
- (c.1.1) rendering said hazardous signals to be non-hazardous to disable transmission of said hazardous signals in response to said determined range of said object residing outside of said operating range.

\* \* \* \* \*